US008877116B2

(12) United States Patent
Grabau

(10) Patent No.: US 8,877,116 B2
(45) Date of Patent: Nov. 4, 2014

(54) METHOD OF MANUFACTURING A WIND TURBINE BLADE SHELL PART COMPRISING A MAGNETISABLE MATERIAL

(75) Inventor: Peter Grabau, Kolding (DK)

(73) Assignee: LM Glasfiber A/S, Kolding (DK)

( * ) Notice: Subject to any disclaimer, the term of this patent is extended or adjusted under 35 U.S.C. 154(b) by 623 days.

(21) Appl. No.: 13/058,605

(22) PCT Filed: Aug. 14, 2009

(86) PCT No.: PCT/EP2009/060569
§ 371 (c)(1),
(2), (4) Date: Mar. 31, 2011

(87) PCT Pub. No.: WO2010/018229
PCT Pub. Date: Feb. 18, 2010

(65) Prior Publication Data
US 2011/0180209 A1    Jul. 28, 2011

(30) Foreign Application Priority Data
Aug. 14, 2008 (EP) .................................. 08014513

(51) Int. Cl.
*B32B 37/10* (2006.01)
*B29C 70/54* (2006.01)
(Continued)

(52) U.S. Cl.
CPC ............... *B29C 70/543* (2013.01); *B32B 37/10* (2013.01); *B29C 33/16* (2013.01); *B29C 70/443* (2013.01); *B29C 70/48* (2013.01); *B29C 70/88* (2013.01); *B29D 99/0025* (2013.01); *B29K 2305/00* (2013.01); *B29K 2305/12* (2013.01); *B29L 2031/082* (2013.01); *B29L 2031/085* (2013.01); *F03D 1/065* (2013.01); *F05B 2280/6013* (2013.01); *F05B 2280/6015* (2013.01); *F05C 2253/16* (2013.01); *F05C 2253/20* (2013.01); *Y02E 10/721* (2013.01)
USPC ........... 264/513; 264/261; 264/314; 264/515; 264/459; 264/571; 156/285; 156/381; 156/382

(58) Field of Classification Search
CPC ...... B32B 37/10; B29C 70/443; B29C 70/44; B29C 70/48
USPC .................. 156/285, 286, 381, 382; 264/261, 264/272.6, 314, 513, 515, 297.2, 257, 459, 264/571
See application file for complete search history.

(56) References Cited

U.S. PATENT DOCUMENTS 5,540,970 A    7/1996  Banfield et al.
6,532,658 B2 *  3/2003  Schreiber .................... 29/889.71
(Continued)

FOREIGN PATENT DOCUMENTS

DE        103 11 654 A1    9/2004
DE    10 2008 055 477 A1    6/2009
(Continued)

OTHER PUBLICATIONS
Machine translation of FR2881371.*

*Primary Examiner* — Christopher Schatz
(74) *Attorney, Agent, or Firm* — Nath, Goldberg & Meyer; Jerald L. Meyer; Sanjana Mangalagiri

(57) ABSTRACT

A method of manufacturing a wind turbine blade shell part comprising fiber material impregnated with cured resin is described. The method comprises the steps of: a) providing a first mold part having a first forming surface with a contour that defines at least a part of an outer surface of turbine blade shell part, b) arranging fiber material in the first mold part, the fiber material comprising fibers of a magnetizable material, c) providing a resin in the first mold part simultaneous with and/or subsequent to step b), and d) curing the resin in order to form the wind turbine blade shell part or wind turbine blade. The fiber material is retained against the first forming surface by use of magnet means during step b) and/or step c).

11 Claims, 5 Drawing Sheets

(51) Int. Cl.
    *B29C 33/16*     (2006.01)
    *B29C 70/44*     (2006.01)
    *B29C 70/48*     (2006.01)
    *B29C 70/88*     (2006.01)
    *B29D 99/00*     (2010.01)
    *F03D 1/06*     (2006.01)
    *B29K 305/00*     (2006.01)
    *B29K 305/12*     (2006.01)
    *B29L 31/08*     (2006.01)

(56) References Cited

U.S. PATENT DOCUMENTS

| | | | |
|---|---|---|---|
| 2003/0116262 A1* | 6/2003 | Stiesdal et al. | 156/245 |
| 2004/0176007 A1 | 9/2004 | Braekevelt | |
| 2004/0188890 A1 | 9/2004 | Sheridan et al. | |

FOREIGN PATENT DOCUMENTS

| | | |
|---|---|---|
| EP | 1 310 351 A1 | 5/2003 |
| FR | 2 881 371 A1 | 8/2006 |

\* cited by examiner

METHOD OF MANUFACTURING A WIND TURBINE BLADE SHELL PART COMPRISING A MAGNETISABLE MATERIAL

This is a National Phase Application filed under 35 U.S.C. 371 as a national stage of PCT/EP2009/060569, filed Aug. 14, 2009, an application claiming the benefit from the European patent Application No. 08014513.9, filed Aug. 14, 2008 the content of each of which is hereby incorporated by reference in its entirety.

TECHNICAL FIELD

The invention relates to a method of manufacturing a wind turbine blade shell part or a wind turbine blade comprising fibre reinforced polymer material including a polymer matrix and fibre reinforcement material embedded in the polymer matrix, a wind turbine blade manufactured via the method, and a mould part for use in such a method.

BACKGROUND

Vacuum infusion or VARTM (vacuum assisted resin transfer moulding) is one method, which is typically employed for manufacturing composite structures, such as wind turbine blades comprising a fibre reinforced matrix material. During the manufacturing process, liquid polymer, also called resin, is filled into a mould cavity, in which fibre material priorly has been inserted, and where a vacuum is generated in the mould cavity hereby drawing in the polymer. The polymer can be thermoset plastic or thermoplastics. Typically, uniformly distributed fibres are layered in a first rigid mould part, the fibres being rovings, i.e. bundles of fibre bands, bands of rovings or mats, which are either felt mats made of individual fibres or woven mats made of fibre rovings. A second mould part, which is often made of a resilient vacuum bag, is subsequently placed on top of the fibre material and sealed against the first mould part in order to generate a mould cavity. By generating a vacuum, typically 80 to 95% of the total vacuum, in the mould cavity between the inner side of the mould part and the vacuum bag, the liquid polymer can be drawn in and fill the mould cavity with the fibre material contained herein. So-called distribution layers or distribution tubes, also called inlet channels, are used between the vacuum bag and the fibre material in order to obtain as sound and efficient a distribution of polymer as possible. In most cases the polymer applied is polyester or epoxy, and the fibre reinforcement is most often based on glass fibres or carbon fibres.

During the process of filling the mould, a vacuum, said vacuum in this connection being understood as an under-pressure or negative pressure, is generated via vacuum outlets in the mould cavity, whereby liquid polymer is drawn into the mould cavity via the inlet channels in order to fill said mould cavity. From the inlet channels the polymer disperses in all directions in the mould cavity due to the negative pressure as a flow front moves towards the vacuum channels. Thus, it is important to position the inlet channels and vacuum channels optimally in order to obtain a complete filling of the mould cavity. Ensuring a complete distribution of the polymer in the entire mould cavity is, however, often difficult, and accordingly this often results in so-called dry spots, i.e. areas with fibre material not being sufficiently impregnated with resin. Thus dry spots are areas where the fibre material is not impregnated, and where there can be air pockets, which are difficult or impossible to remove by controlling the vacuum pressure and a possible overpressure at the inlet side. In vacuum infusion techniques employing a rigid mould part and a resilient mould part in the form of a vacuum bag, the dry spots can be repaired after the process of filling the mould by puncturing the bag in the respective location and by drawing out air for example by means of a syringe needle. Liquid polymer can optionally be injected in the respective location, and this can for example be done by means of a syringe needle as well. This is a time-consuming and tiresome process. In the case of large mould parts, staff have to stand on the vacuum bag. This is not desirable, especially not when the polymer has not hardened, as it can result in deformations in the inserted fibre material and thus in a local weakening of the structure, which can cause for instance buckling effects.

Often the composite structures comprise a core material covered with a fibre reinforced material, such as one or more fibre reinforced polymer layers. The core material can be used as a spacer between such layers to form a sandwich structure and is typically made of a rigid, lightweight material in order to reduce the weight of the composite structure. In order to ensure an efficient distribution of the liquid resin during the impregnation process, the core material may be provided with a resin distribution network, for instance by providing channels or grooves in the surface of the core material.

As for instance blades for wind turbines have become bigger and bigger in the course of time and may now be more than 60 meters long, the impregnation time in connection with manufacturing such blades has increased, as more fibre material has to be impregnated with polymer. Furthermore the infusion process has become more complicated, as the impregnation of large shell members, such as blades, requires control of the flow fronts to avoid dry spots, said control may e.g. include a time-related control of inlet channels and vacuum channels. This increases the time required for drawing in or injecting polymer. As a result the polymer has to stay liquid for a longer time, normally also resulting in an increase in the curing time.

Resin transfer moulding (RTM) is a manufacturing method, which is similar to VARTM. In RTM the liquid resin is not drawn into the mould cavity due to a vacuum generated in the mould cavity. Instead the liquid resin is forced into the mould cavity via an overpressure at the inlet side.

Prepreg moulding is a method in which reinforcement fibres are pre-impregnated with a pre-catalysed resin. The resin is typically solid or near-solid at room temperature. The prepregs are arranged by hand or machine onto a mould surface, vacuum bagged and then heated to a temperature, where the resin is allowed to reflow and eventually cured. This method has the main advantage that the resin content in the fibre material is accurately set beforehand. The prepregs are easy and clean to work with and make automation and labour saving feasible. The disadvantage with prepregs is that the material cost is higher than for non-impregnated fibres. Further, the core material need to be made of a material, which is able to withstand the process temperatures needed for bringing the resin to reflow. Prepreg moulding may be used both in connection with a RTM and a VARTM process.

Further, it is possible to manufacture hollow mouldings in one piece by use of outer mould parts and a mould core. Such a method is for instance described in EP 1 310 351 and may readily be combined with RTM, VARTM and prepreg moulding.

FR2881371A describes a method for manufacturing small tubular composite structures, such as seat frames, having a diameter of a few centimeters the most. The procedure consists of inserting a component made from braided metal filaments and thermoplastic fibres in a mould cavity and heating the metal by induction to melt the thermoplastic. The heat is then shut off to allow the plastic to cool and set, and the plastic coated component is then removed from the mould. A section of the braided component can be stretched or compressed to reduce or increase its diameter while it is being inserted in the mould, and during the heating and cooling stages it can be held against the walls of the mould cavity by a magnetic field, using electromagnets for braiding of a magnetic material. The braided component can alternatively be made from plastic-coated metal filaments.

A wind turbine blade comprises a number of relatively complex contours or profiles in the longitudinal direction of the blade. Over the years, the shape of conventional wind turbine blades has developed towards a design comprising a root region with a substantially circular or elliptical profile closest to the hub, and an airfoil region with a lift generating profile furthest away from the hub. The blade optionally comprises a transition region between the root region and the airfoil region, wherein the profile of the transition region gradually changes in the radial direction from the circular profile of the root region to the lift generating profile of the airfoil region. Typically, the airfoil region extends from a position of a maximum chord length to the tip end of the blade. This position is typically located at a radial distance from the root of about 20% of the blade length. The suction side of the blade typically has a convex envelope, whereas the pressure side for instance may comprise a double curvature, i.e. partly a convex envelope and partly a concave curvature. Consequently, the mould parts need to have a similar complex structure.

During the manufacturing of such wind turbine blades a number of fibre layers are arranged above the forming surface of the mould part. Due to varying curvature of the forming surface retaining means, such as clamping means, are often used in order to retain or secure the fibre layers against the forming surface of the mould. This is especially apparent at the root region of the blade due to the circular profile. However, the clamping means need to be loosened every time a new layer of fibres is arranged above a previous layer. Subsequently, the clamping means need to be reclamped in order to retain the fibre layers against the forming surface. This is a tedious process and in worst case the clamping means may damage the fibre layers, causing local weaknesses in the finished wind turbine blade.

DISCLOSURE OF THE INVENTION

It is an object of the invention to obtain a new method for manufacturing wind turbine blade shell parts or wind turbine blades by for instance VARTM processes, and which overcomes or ameliorates at least one of the disadvantages of the prior art or which provides a useful alternative. It is also an object to provide a new and improved wind turbine blade obtainable via the new method as well as a mould for use in the method.

According to another object of the invention to obtain a new method for manufacturing composite structures, such as sandwich structures, by for instance VARTM processes, and which overcomes or ameliorates at least one of the disadvantages of the prior art or which provides a useful alternative. It is also an object to provide a new and improved composite structure obtainable via the new method as well as a mould for use in the method.

According to a first aspect, the invention provides a method of manufacturing a wind turbine blade shell part of a wind turbine blade comprising fibre reinforced polymer material including a polymer matrix and fibre material embedded in the polymer matrix, wherein the method comprises the following steps: a) providing a first mould part having a first forming surface with a contour that defines at least a part of an outer surface of the wind turbine blade shell part or wind turbine blade, b) arranging fibre material in the first mould part, the fibre material comprising fibres of a magnetisable material, c) providing a resin in the first mould part subsequently to step b), and d) curing the resin in order to form the wind turbine blade shell part or wind turbine blade, wherein the fibre material is retained against the first forming surface by use of magnet means during step b) and/or step c).

According to another broader aspect, the invention provides a method of manufacturing a composite structure comprising fibre reinforced polymer material including a polymer matrix and fibre material embedded in the polymer matrix, wherein the method comprises the following steps: a) providing a first mould part having a first forming surface with a contour that defines at least a part of an outer surface of the composite structure, b) arranging fibre material in the first mould part, the fibre material comprising fibres of a magnetisable material, c) providing a resin in the first mould part simultaneously with and/or subsequently to step b), and d) curing the resin in order to form the composite structure, wherein the fibre material is retained against the first forming surface by use of magnet means during step b) and/or step c).

Thus, it is seen that the inventive concept behind the invention relates to the use of magnet means for retaining or securing the fibre material against the forming surface of a mould part in a method of manufacturing a wind turbine blade shell part or a wind turbine blade or another large composite structure. The inventive concept is applicable to both manual resin supply, resin transfer moulding (RTM), vacuum assisted resin transfer moulding (VARTM), and for the production of non-hollow and hollow mouldings. The magnet means makes it possible to retain the fibre material against the first forming surface in a non-intrusive way, thus being able to retain the fibre material without damaging the fibres and thus causing local weaknesses in the composite structure.

The particular composite structure or the wind turbine blade shell part preferably has a length at least 20 meters, or at least 30 meters, or at least 40 meters. Further, it preferably comprises parts having a width of at least 1 meter, or at least 1.5 meters, or at least 2 meters.

In the following advantageous embodiments are described. These relate both to the first aspect and the broader aspects of the invention.

The resin may be a thermosetting resin, such as epoxy, vinylester, polyester. The resin may also be a thermoplastic, such as nylon, PVC, ABS, polypropylene or polyethylene. Yet again the resin may be a thermosetting thermoplastic, such as cyclic PBT or PET.

However, according to a particularly advantageous embodiment, the resin comprises an in-situ polymerisable thermoplastic material. The in-situ polymerisable thermoplastic material may advantageously be selected from the group consisting of pre-polymers of: polybutylene terephthalate (PBT), polyamide-6 (pre-polymer is caprolactam), polyamide-12 (pre-polymer is laurolactam) alloys of polyamide-6 and polyamide-12; polyurethanes (TPU), polymethylmethacrylate (PMMA), polyethylene terephthalate (PET), polycarbonate (PC), polyetheretherketone (PEEK), polyetherketone (PEK), polyethersulfone (PES), polyphenylenesulphide (PPS), polyethylenenaphthalate (PEN) and polybutylenenaphthalate (PBN), cyclic poly(1,4-butylene terephthalate) (CBT) and/or combinations thereof.

The in-situ polymerisable thermoplastic material has the advantage that it may be handled in its pre-polymer state and can be handled in as a liquid, a powder or pellets. Accordingly, the material may be used for pre-impregnating the fibre material, i.e. in a prepreg. Alternatively, it may be sprayed on in powder form on the fibre material or be arranged in the mould parts as separate layers.

In-situ polymerisable thermoplastic materials, such as CBT, has the advantage that they obtain a water-like viscosity when heated to a temperature of approximately 150 degrees Celsius. Thereby, it is possible to quickly impregnate the fibre material of very large composite structures to be moulded and subsequently curing the resin in very short cycle times.

CTB is available as one-part systems, where a catalyst is premixed into the resin, and where the catalyst is activated for instance by heating, and as two-part systems, where the catalyst and resin are kept separately until immediately before use.

In some situations it may be advantageous—as previously explained—to draw in additional in-situ polymerisable thermoplastic material in order to impregnate the entire fibre material. In such a situation it may be advantageous to use one-part systems for the pre-supplied resin and two-part systems for the additional resin.

The term polymerisable thermoplastic material means that the material may be polymerised once at the manufacturing site.

According to a first advantageous embodiment, the method further comprises the step of providing a second mould part and sealing the second mould part against the first mould part in order to form a mould cavity. Thus, the fibre material and resin is arranged or provided in the mould cavity. The first mould part may for instance be a rigid mould part. The second mould part may for instance be a vacuum bag. Alternatively, the second mould part may be a rigid mould part having a second moulding surface with a contour that defines at least a part of an outer surface of the composite structure, i.e. the wind turbine blade shell part or the wind turbine blade According to another advantageous embodiment, the mould cavity is connected to a source of uncured fluid resin via at least one resin inlet communicating with the mould cavity, and uncured resin from the source of uncured resin is supplied to the mould cavity through the at least one resin inlet during step c) so as to fill the mould cavity with resin. This embodiment relates to a resin transfer moulding manufacturing method, wherein the resin is supplied to the mould cavity via a pressure differential between the source of uncured resin and the mould cavity.

According to yet another advantageous embodiment, at least one vacuum outlet communicating with the mould cavity is connected to the mould cavity, and the mould cavity is evacuated prior to step c) via the at least one vacuum outlet. Thereby, the pressure differential may be formed by creating a vacuum or underpressure in the mould cavity in order to draw in the liquid resin to the mould cavity. Thus, this embodiment relates to vacuum infusion or vacuum assisted resin transfer moulding (VARTM).

In another embodiment according to the invention, a number of pre-impregnated elements comprising a fibre material are inserted in the first mould part or the mould cavity during step b). The use of so-called prepregs may be combined with both the RTM and VARTM methods. Typically, the prepregs are heated in order to liquidise the resin, allowing it to reflow and proving a uniform impregnation of all the fibre material. The heating eventually allows the resin to cure.

In yet another embodiment according to the invention, the composite structure, i.e. the wind turbine blade shell part, is made in one, hollow piece in a closed mould, the closed mould comprising: a mould core and outer mould parts arranged to close around the mould core in order to form a mould cavity there between, the outer mould parts comprising at least: the first mould part comprising the first forming surface with a contour that defines at least a part of an outer surface of the composite structure, and a second mould part comprising a second forming surface with a contour that defines at least a part of an outer surface of the composite structure, and wherein the fibre material in step b) is arranged on an outer mould part and/or the mould core. The invention is particularly suited for this type of composite structure, since typically at least a part of the first forming surface and/or the second forming surface during the manufacturing process faces downward, therefore needing retaining means in order to secure the fibre material against the forming surfaces.

According to an advantageous embodiment, the closed mould is rotated about a longitudinal axis prior to supplying liquid resin to the mould cavity in step c). Typically, the first forming surface and the second forming surface correspond to the pressure side and suction side of the wind turbine blade, respectively. During step b) the first mould part is arranged so that the first forming surface faces upwards. After all material has been arranged in the mould cavity, the closed mould may be turned approximately 90 degrees about the longitudinal axis in order to supply liquid from resin inlets, which in this mould position is arranged at a low point in the cross-section of the closed mould, e.g. at a trailing edge or leading edge of the wind turbine blade. Further, a vacuum outlet may be arranged at the highest point of the cross-section of the closed mould, optionally with an overflow vessel for collecting resin, which inadvertently has been sucked into the vacuum outlet.

According to yet another advantageous embodiment, the magnetisable material is a metal, such as steel. That is, the fibre material comprises steel fibres. Steel fibres have been found to have favourable properties with respect to both the impregnation process and strength in the finished composite structure.

In one embodiment according to the invention, the fibre material comprises a number of fibre layers. According to a first advantageous embodiment, at least an outer fibre layer comprises the magnetisable material. An outer fibre layer means a layer, which is furthest away from the forming surface of the mould part. Thus, the magnet means attracts the outer fibre layer, thus retaining the outer fibre layer and any material between the outer fibre layer and the forming surface against the forming surface.

According to another advantageous embodiment, the fibre material comprises hybrid mats comprising first fibres of a first, magnetisable material, such as steel, and second fibres of a second material, e.g. a non-magnetisable material, such as glass or carbon. The fibres of different materials may for instance be weaved together.

According to an alternative embodiment, pre-cured reinforcement elements, such as pre-cured reinforcement strips, are arranged in the first mould part or the mould cavity during step b). Such elements can be handled easily and reduce the necessary time for injecting the resin, thus providing the potential of decreasing the overall manufacturing time. The pre-cured strips may of course be combined with the use of pre-impregnated materials or non-impregnated materials, such that the pre-cured strips are moulded into the composite structure.

The resin may be a thermosetting plastic or thermoplastic, and typically an epoxy, polyester or vinylester based resin is used.

According to a preferred embodiment, the finished composite structure is an oblong structure, such as a wind turbine blade shell part, and has a longitudinal direction and a transverse direction. In an advantageous embodiment according to the invention, the oblong structure comprises a longitudinally extending reinforcement section comprising a plurality of fibre layers. The reinforcement section is also called a main laminate.

According to yet another embodiment, the finished composite structure further comprises a core material, such as balsa wood, foamed polymer or concrete.

According to a second aspect, the invention provides a wind turbine blade or wind turbine blade part obtainable according to any of the aforementioned methods.

According to a third aspect, the invention provides a mould part for manufacturing a wind turbine blade shell part or a wind turbine blade comprising a forming surface corresponding to at least an outer surface of a wind turbine blade shell part or a wind turbine blade to be manufactured via said mould part, wherein the mould part comprises magnet means arranged so as to be able to retain a fibre material comprising a magnetisable material against the forming surface. Hereby, a mould part is provided, which makes it possible to non-intrusively retain or secure a fibre material comprising a magnetisable material against the forming surface of the mould part.

According to a third broader aspect, the invention provides a mould part for manufacturing composite structure, preferably having a length of at least 20 meters, comprising a forming surface corresponding to at least an outer surface of a composite structure to be manufactured via said mould part, wherein the mould part comprises magnet means arranged so as to be able to retain a fibre material comprising a magnetisable material against the forming surface. Hereby, a mould part is provided, which makes it possible to non-intrusively retain or secure a fibre material comprising a magnetisable material against the forming surface of the mould part.

According to an advantageous embodiment, the magnet means comprises a number of electromagnets. Thereby, a particularly simple embodiment is provided, where a strong magnetic force can be generated. Further, the electromagnet makes it possible to turn the magnetic attraction force off, if the fibre material needs to be rearranged. Alternatively, the electromagnets may be turned sequentially on and off during the preparation of the fibre material in the mould part, which may facilitate the process of preparing fibre layers in the mould cavity.

BRIEF DESCRIPTION OF THE DRAWINGS

The invention is explained in detail below with reference to the drawing(s), in which.

DETAILED DESCRIPTION OF THE INVENTION

Figure 1:
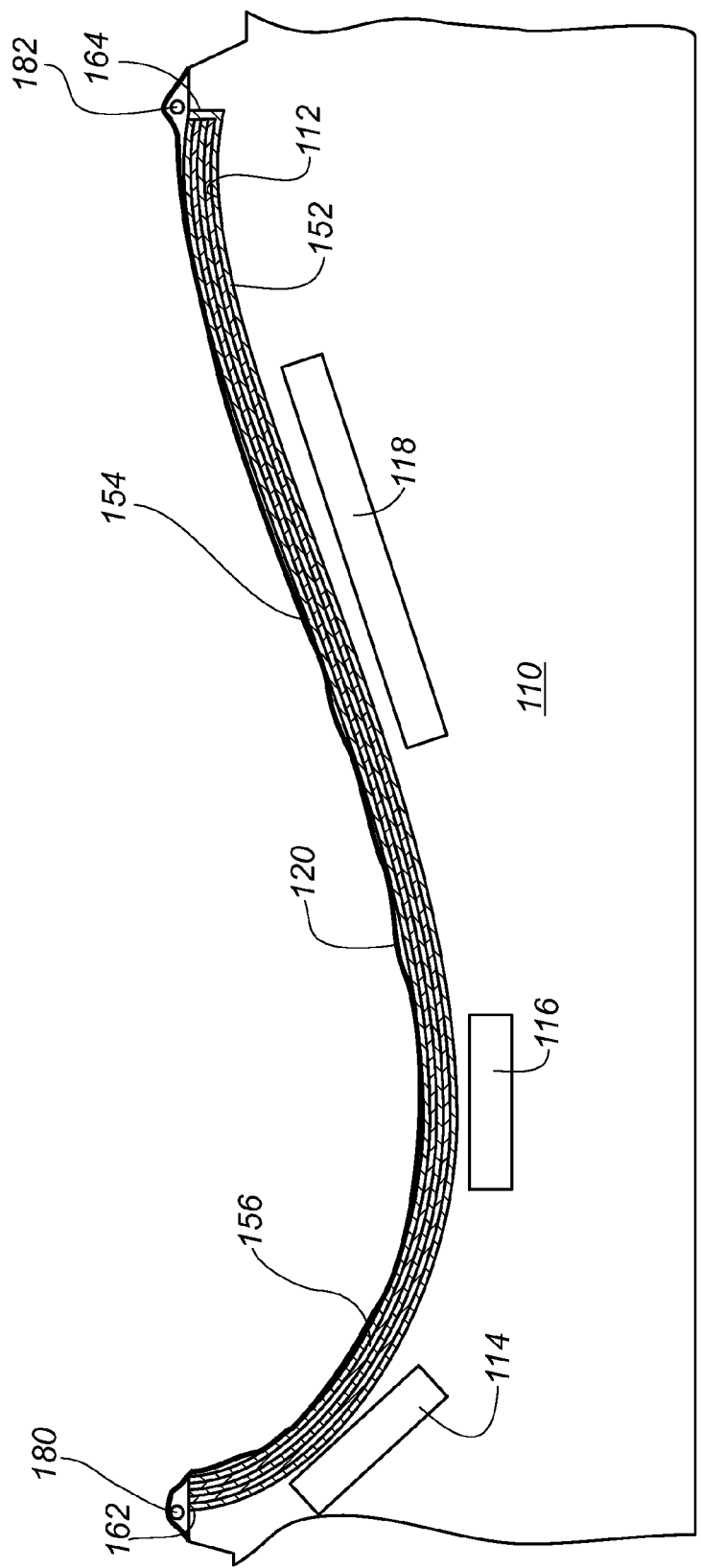
FIG. 1 shows a schematic cross section of a first embodiment of a mould part with fibre material arranged in the mould part.

FIG. 1 shows a cross-sectional view through a first mould part 110 for use in a VARTM process. The first mould part 110 has an upwardly facing forming surface 112, and a vacuum bag 120 is sealed against the first mould part 110, thus forming a mould cavity between the first mould part 110 and the vacuum bag 120. A number of fibre layers 152, 154, 156 are placed in the mould cavity, these fibre layers being included in a finished wind turbine blade shell part comprising a leading edge 162 and a trailing edge 164. The fibre layers comprise fibres of a magnetisable material, e.g. metal and preferably steel fibres. The fibre layers may comprise steel fibres only. Alternatively, hybrid fibre mats comprising steel fibres and for instance glass fibres or carbon fibre may be used. The inner layers are optionally coated with a gel coat, which define the exterior surface of the shell part.

The arrangement for the VARTM process comprises a number of vacuum outlets for initially evacuating the mould cavity in an evacuation process and later drawing in liquid resin supplied from a number of resin inlet channels in an impregnation process. In the depicted embodiment, a resin inlet 180 is provided at a first rim of the first mould part 110, viz. the leading edge 162 of the finished wind turbine blade shell part, and a vacuum outlet 182 is provided at a second rim of the first mould part 110, viz. the trailing edge 164 of the finished wind turbine blade shell part. The particular arrangement of the resin inlet 180 and the vacuum outlet is meant as an example only, and many variations are possible.

The first mould part 110 comprises magnet means in form of a number of electromagnets 114, 116, 118. The magnet means may be formed as a single electromagnet along the forming surface 112 or may comprise a plurality of electromagnets 114, 116, 118 as shown in the figure. The electromagnets can be used to retain or secure the fibre layers 152, 154, 156 against the forming surface 112 during the process of arranging the fibre layers 152, 154, 156 in the mould cavity and/or the evacuation process and/or the following impregnation process.

Figure 2:
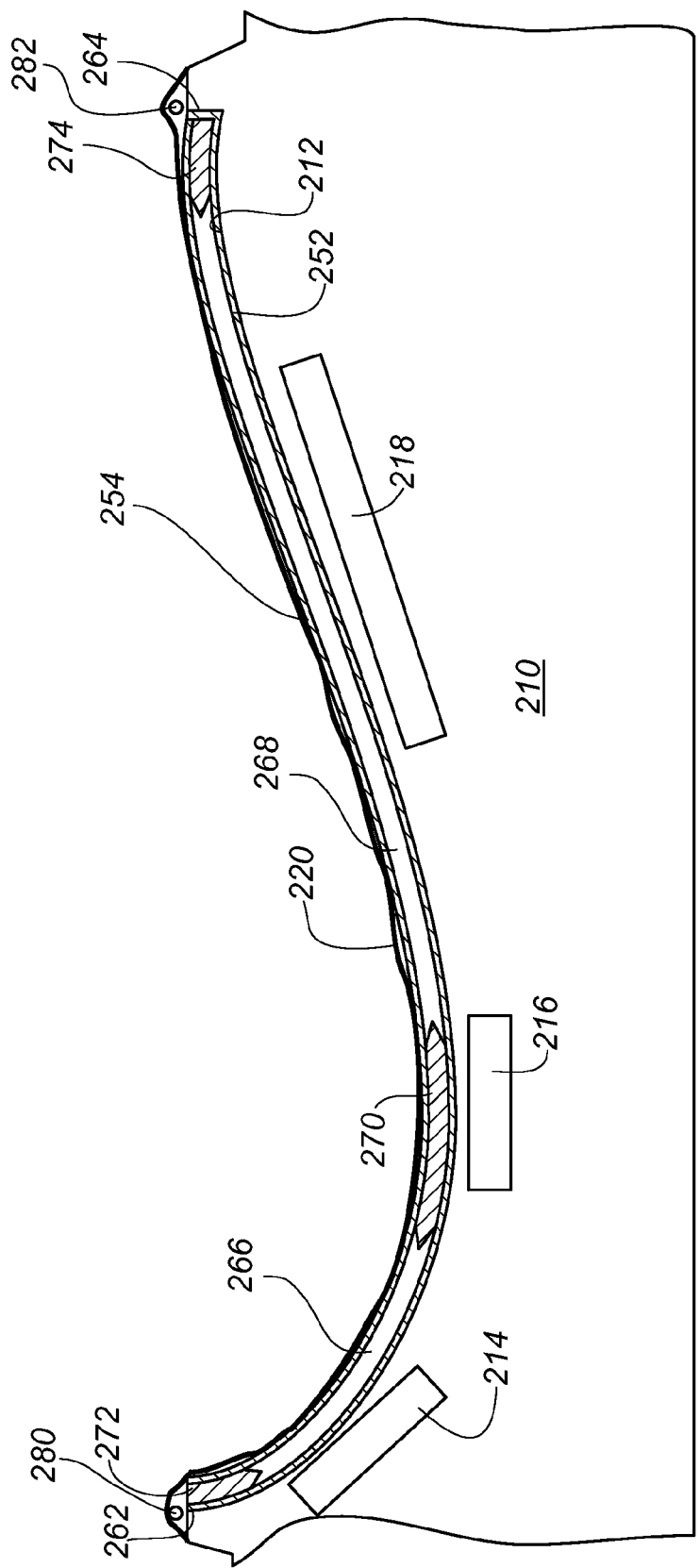
FIG. 2 shows a schematic cross section of a second embodiment of a mould part with fibre material arranged in the mould part.

FIG. 2 shows a cross-sectional view through a second embodiment of a first mould part 210 for use in a VARTM process. The mould part 210 comprises a mould cavity formed between a forming surface 212 and a vacuum bag 220, and in which a number of fibre layers, core parts and reinforcement sections are placed, these parts being included in a finished wind turbine blade shell part. The blade shell part comprises one or more lower fibre layers 252 impregnated with resin and optionally coated with a gelcoat, which define the exterior surface of the shell part, and one or more upper fibre layers 254 impregnated with resin, and which define the interior surface of the shell part. The upper fibre layer(s) 254 and lower fibre layer(s) 252 are separated by a fibre insertion or main laminate 270 comprising a plurality of fibre layers impregnated with resin, a first core part 266 and a second core part 268, as well as a first fibre reinforcement 274 at a trailing edge 264 of the shell part and a second fibre reinforcement 272 at a leading edge 262 of the shell part.

The arrangement for the VARTM process comprises a number of vacuum outlets and a number of resin inlet channels. In the depicted embodiment, a resin inlet 280 is provided at a first rim of the first mould part 210, viz. the leading edge 262 of the wind turbine blade shell part, and a vacuum outlet 282 is provided at a second rim of the first mould part 210, viz. the trailing edge 264 of the wind turbine blade shell part. The particular arrangement of the resin inlet 280 and the vacuum outlet 282 is meant as an example only, and many variations are possible.

Similar to the first embodiment, the first mould part 210 comprises magnet means in form of a number of electromagnets 214, 216, 218. The magnet means may be formed as a single electromagnet along the forming surface 212 or may comprise a plurality of electromagnets 214, 216, 218 as shown in the figure. The electromagnets can be used to retain or secure the fibre layers 252, 254, 256 against the forming surface 212 during the process of arranging the fibre layers 252, 254, 256 in the mould cavity and/or the evacuation process and/or the following impregnation process.

Figure 3:
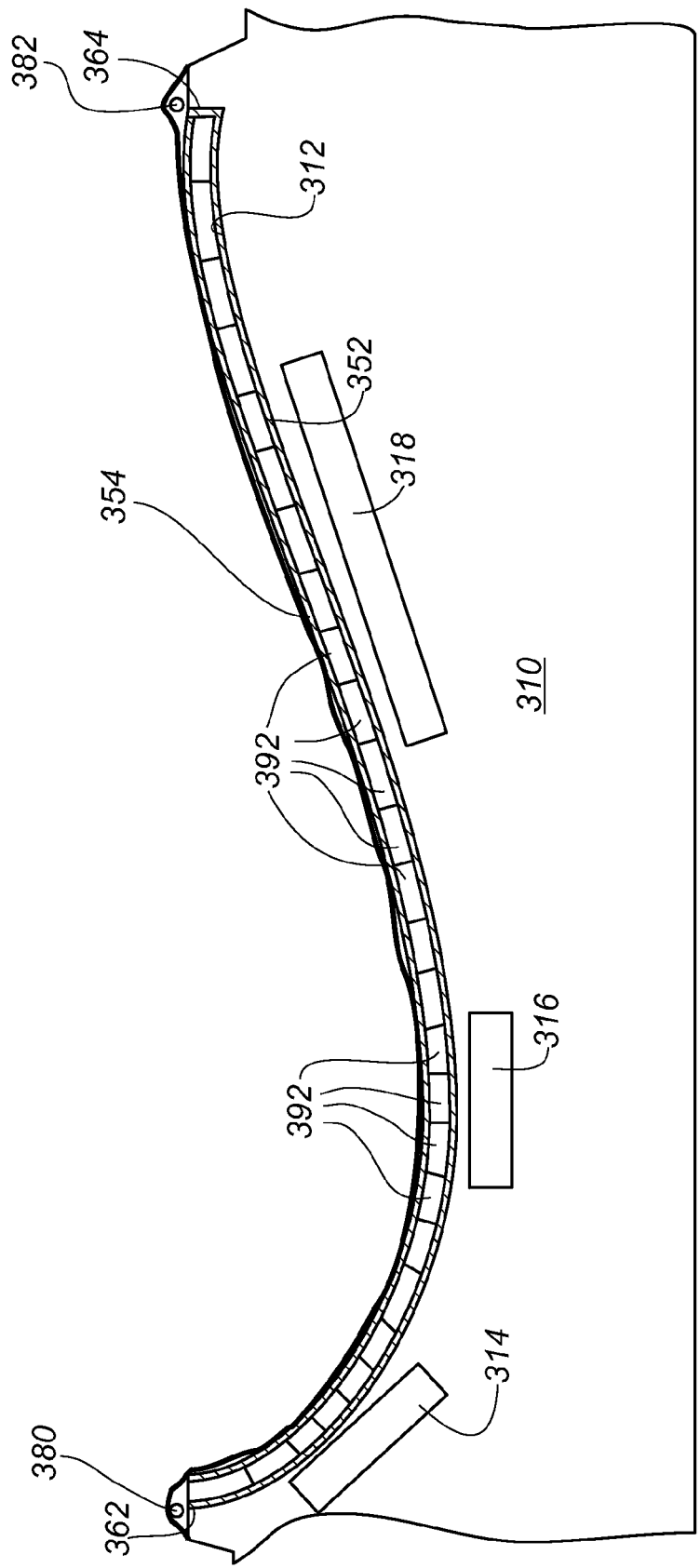
FIG. 3 shows a schematic cross section of a third embodiment of a mould part with fibre material arranged in the mould part.

FIG. 3 shows a cross-sectional view through a third embodiment of a first mould part 310 for use in a VARTM process, and in which like numerals refer to similar parts shown in FIG. 1. Therefore, only the difference between the embodiments is described. In this embodiment a number of prepregs 392 and/or pre-cured elements comprising fibre material are arranged between a number of outer fibre layers 354 and a number of inner fibre layers 352, optionally coated with a gelcoat, which define a part of the exterior surface of the blade shell part. The prepregs are preimpregnated with resin, and the mould cavity is heated to a temperature, where the resin is allowed to reflow thus filling the mould cavity and the fibre material arranged therein. The heating eventually allows the resin to cure.

Figure 4:
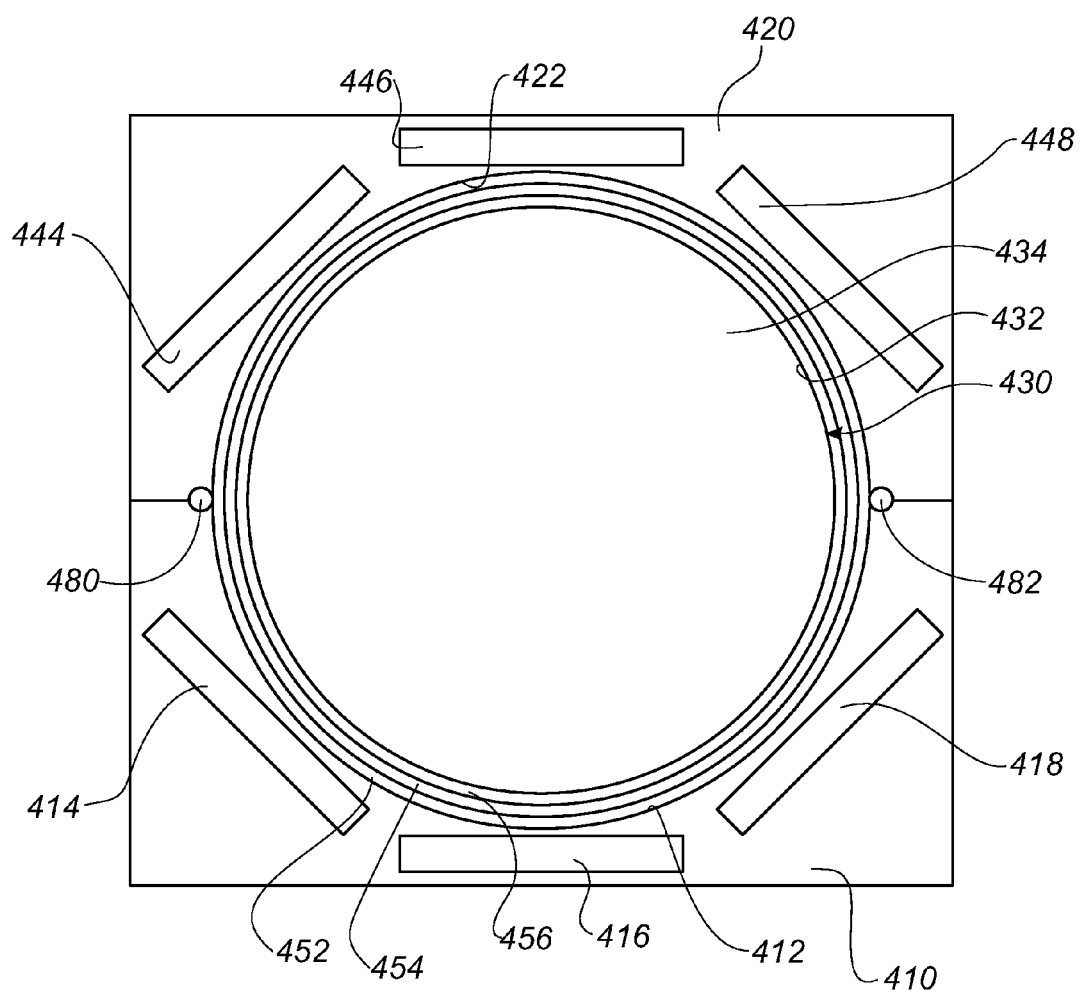
FIG. 4 shows a schematic cross section of a fourth embodiment of a mould part with fibre material arranged in the mould part.

FIG. 4 shows a cross-sectional view through a fourth embodiment of a mould for use in a VARTM process, and in which like numerals refer to similar parts shown in FIG. 1. The figure shows an embodiment in which the wind turbine blade (here depicted as a cross section of the circular root section) is manufactured as one, hollow piece instead of as two separate shell parts, which subsequently are glued together. The wind turbine blade is manufactured in a closed mould, which comprises a mould core 430 and a first mould part 410 and a second mould part 420 arranged to close around the mould core 430, thus forming a mould cavity there between. The first mould part 410 comprises a first forming surface 412 with a first contour that defines a part of the outer surface of the wind turbine blade, and the second mould part 420 comprises a second forming surface 422 with a second contour that defines another part of the outer surface of the wind turbine blade. The mould core 430 comprises an outer, flexible core part 432, which defines the inner surface of the wind turbine blade, and an internal, firm or workable core part 434. A number of fibre layers 452, 454, 456 is arranged in the mould cavity between the outer mould parts 410, 420 and the mould core 430.

The first mould 410 part comprises a number of electromagnets 414, 416, 418 for retaining the fibre layers 452, 454, 456 against the first forming surface 412, and the sec- and mould part 420 comprises a number of electromagnets 444, 446, 448 for retaining the fibre layers 452, 454, 456 against the second forming surface 422. Thus the fibre layers can be secured against the forming surfaces during layup of the fibre layers and during the subsequent evacuation and impregnation procedures.

Figure 5:
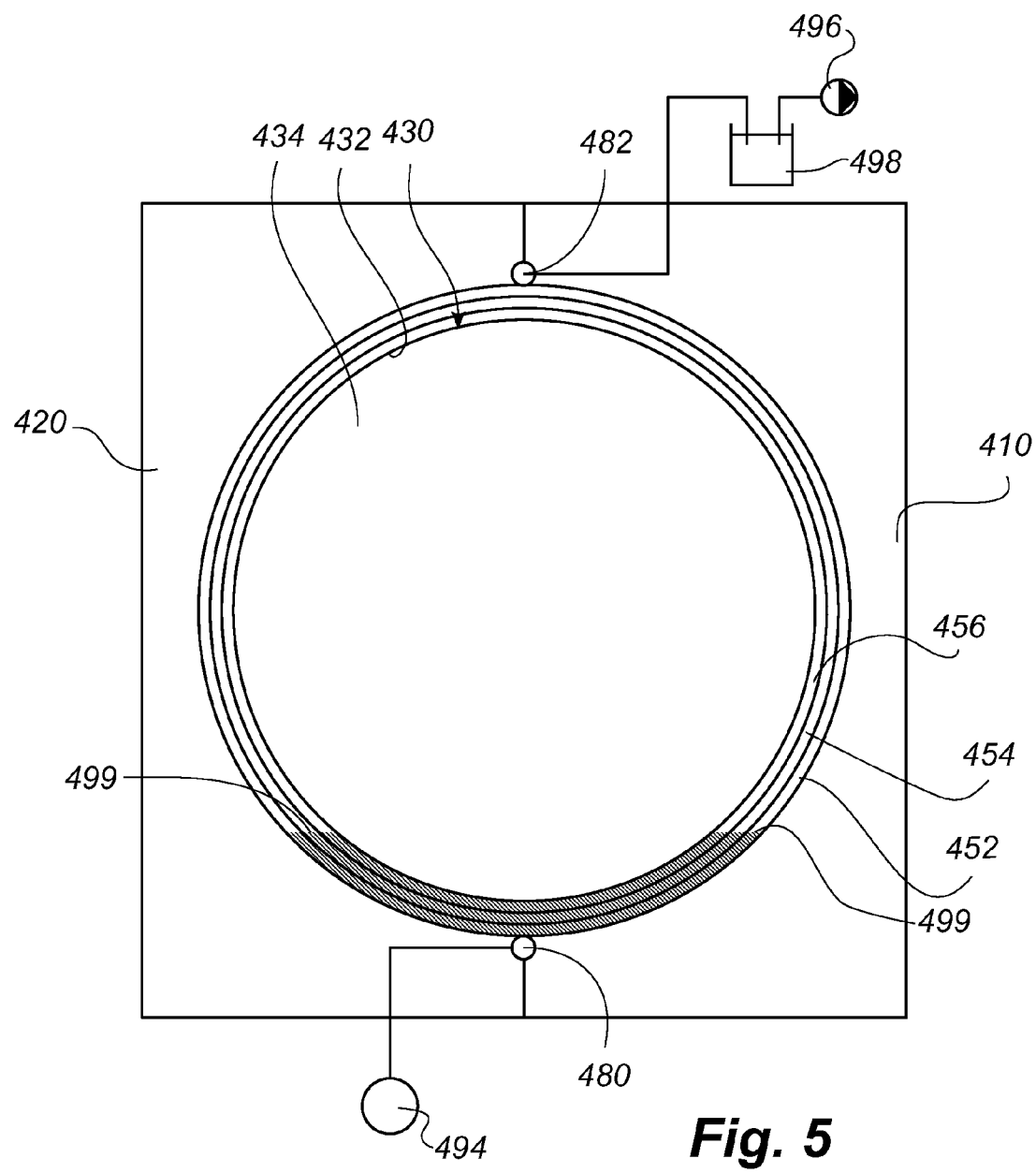
FIG. 5 shows a schematic cross section of the fourth embodiment during an impregnation process.

After all material has been arranged in the mould cavity, the closed mould may, as shown in FIG. 5, be rotated approximately 90 degrees about the longitudinal axis in order to supply liquid from resin inlets 480 connected to a source of uncured resin and assuming a low point in the cross-section of the closed mould. Further, a vacuum outlet 482 connected to a vacuum source 496, such as a vacuum pump, may be arranged at the highest point of the cross-section of the closed mould, optionally with an overflow vessel 498 for collecting resin, which has been sucked into the vacuum outlet 482. By regulating the amount of resin supplied from the resin inlets 480 it is possible to control flow fronts of liquid resin 499 in order to maintain a balance between the injected resin and gravity, thus avoiding the formation of air pockets within the wind turbine blade.

The invention has been described with reference to advantageous embodiments. However, the scope of the invention is not limited to the illustrated embodiment, and alterations and modifications can be carried out without deviating from the scope of the invention.

LIST OF REFERENCE NUMERALS

110, 210, 310, 410 first mould part
112, 212, 312, 412 forming surface
114, 214, 314, 414 magnet means/electromagnet
116, 216, 316, 416 magnet means/electromagnet
118, 218, 318, 418 magnet means/electromagnet
120, 220, 320, 420 second mould part/vacuum bag
422 second forming surface
430 mould core
432 outer, flexible core part
434 inner, firm or workable core part
444, 446, 448 magnet means/electromagnets
150, 250, 350, 450 composite structure/wind turbine blade shell part
152, 252, 352, 452 fibre layer
154, 254, 354, 454 fibre layer
156, 456 fibre layer
162, 262, 362, 462 leading edge
164, 264, 364, 464 trailing edge
266 first core part
268 second core part
270 reinforcement section/main laminate/fibre insertion
272 first fibre reinforcement
274 second fibre reinforcement
180, 280, 380, 480 resin inlet
182, 282, 382, 482 vacuum outlet
392 prepregs
494 source of uncured resin
496 vacuum source
498 overflow vessel
499 flow fronts

The invention claimed is:

1. A method of manufacturing a wind turbine blade shell part or a wind turbine blade comprising fibre reinforced polymer material including a polymer matrix and fibre material embedded in the polymer matrix, wherein the method comprises the following steps:
   a) providing a first mould part having a first forming surface with a contour that defines at least a part of an outer surface of the turbine blade shell part or the wind turbine blade,
   b) arranging fibre material in the first mould part, the fibre material comprising fibres of a magnetisable material,
   c) providing a resin in the first mould part subsequently to step b), and
   d) curing the resin in order to form the turbine blade shell part or the wind turbine blade, wherein
   the fibre material is retained against the first forming surface by use of magnet means during step b) and/or step c).

2. A method according to claim 1, wherein the method further comprises the step of providing a second mould part and sealing the second mould part against the first mould part in order to form a mould cavity.

3. A method according to claim 2, wherein the mould cavity is connected to a source of uncured fluid resin via at least one resin inlet communicating with the mould cavity, and uncured resin from the source of uncured resin is supplied to the mould cavity through the at least one resin inlet during step c) so as to fill the mould cavity with resin.

4. A method according to claim 3, wherein at least one vacuum outlet communicating with the mould cavity is connected to the mould cavity, and the mould cavity is evacuated prior to step c) via the at least one vacuum outlet.

5. A method according to claim 1, wherein a number of pre-impregnated elements comprising a fibre material are inserted in the first mould part or the mould cavity during step b).

6. A method according to claim 1, wherein the wind turbine blade shell part is made in one, hollow piece in a closed mould, the closed mould comprising: a mould core and outer mould parts arranged to close around the mould core in order to form a mould cavity there between, the outer mould parts comprising at least: the first mould part comprising the first forming surface with a contour that defines at least a part of an outer surface of the wind turbine blade shell part, and a second mould part comprising a second forming surface with a contour that defines at least a part of an outer surface of the wind turbine blade shell part, and wherein the fibre material in step b) is arranged on an outer mould part and/or the mould core.

7. A method according to claim 1, wherein the magnetisable material is a metal, the metal being steel.

8. A method according to claim 1, wherein the fibre material comprises a number of fibre layers.

9. A method according to claim 1, wherein at least an outer fibre layer comprises the magnetisable material.

10. A method according to claim 1, wherein the fibre material comprises hybrid mats comprising first fibres of a first, magnetisable material, the magnetisable material being steel, and second fibres of a second material, the second material being a non-magnetisable material, the non-magnetisable material selected from a group comprising glass and carbon.

11. A method according to claim 1, wherein the wind turbine blade shell part or wind turbine blade further comprises a core material, the core material selected from the group comprising balsa wood, foamed polymer or concrete.

* * * * *